(12) United States Patent
Kinoshita et al.

(10) Patent No.: US 11,204,024 B2
(45) Date of Patent: Dec. 21, 2021

(54) MOTOR-DRIVEN COMPRESSOR

(71) Applicant: KABUSHIKI KAISHA TOYOTA JIDOSHOKKI, Kariya (JP)

(72) Inventors: Yusuke Kinoshita, Kariya (JP); Keiji Yashiro, Kariya (JP); Kazuhiro Shiraishi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 10 days.

(21) Appl. No.: 16/829,266

(22) Filed: Mar. 25, 2020

(65) Prior Publication Data

US 2020/0309107 A1  Oct. 1, 2020

(30) Foreign Application Priority Data

Mar. 28, 2019  (JP) .............................. JP2019-064014

(51) Int. Cl.
| | |
|---|---|
| *F04B 35/04* | (2006.01) |
| *F04B 39/12* | (2006.01) |
| *H02K 11/00* | (2016.01) |
| *H02P 27/08* | (2006.01) |
| *H02M 1/12* | (2006.01) |
| *F04C 29/00* | (2006.01) |

(52) U.S. Cl.
CPC ............ *F04B 35/04* (2013.01); *F04B 39/121* (2013.01); *H02K 11/0094* (2013.01); *F04C 29/00* (2013.01); *H02M 1/123* (2021.05); *H02P 27/08* (2013.01)

(58) Field of Classification Search
CPC ........ F04B 35/04; F04B 39/121; F04C 29/00; F04C 23/02; F04C 18/0215; H02P 27/08; H02M 1/12; H02M 1/123; H02K 11/0094
See application file for complete search history.

(56) References Cited

U.S. PATENT DOCUMENTS

| | | | | |
|---|---|---|---|---|
| 4,908,738 | A | * 3/1990 | Kobari ................. | H05K 7/1432 361/829 |
| 2015/0056086 | A1 | * 2/2015 | Yano ...................... | H02K 11/33 417/410.5 |
| 2015/0061421 | A1 | * 3/2015 | Yano ...................... | H02K 11/33 310/52 |
| 2015/0061558 | A1 | 3/2015 | Yano et al. | |
| 2017/0288512 | A1 | * 10/2017 | Kagawa ............... | B60H 1/3222 |
| 2018/0180061 | A1 | * 6/2018 | Kinoshita ............... | F04B 35/04 |

FOREIGN PATENT DOCUMENTS

| | | |
|---|---|---|
| JP | 2015-048800 A | 3/2015 |
| JP | 2015-050873 A | 3/2015 |

* cited by examiner

*Primary Examiner* — Essama Omgba
*Assistant Examiner* — Christopher J Brunjes
(74) *Attorney, Agent, or Firm* — Sughrue Mion, PLLC

(57) ABSTRACT

A screw member that has passed through a holder insertion hole and a resistor insertion hole being screwed into an internal threaded hole fixes a holder and a resistor to a bottom wall of a motor housing member. Thus, the resistor is attached to the motor housing member using the screw member that attaches the holder to the motor housing member. This reduces the space in the inverter accommodation chamber.

6 Claims, 5 Drawing Sheets

MOTOR-DRIVEN COMPRESSOR

BACKGROUND

1. Field

The following description relates to a motor-driven compressor.

2. Description of Related Art

The motor-driven compressor includes a rotary shaft, a compression portion that compresses fluid by rotation of the rotary shaft, an electric motor that rotates the rotary shaft, and an inverter circuit that drives the electric motor. The motor-driven compressor also includes a capacitor and a coil. The capacitor is arranged on an input side of the inverter circuit and connected in parallel to a direct-current power supply. The coil configures an LC filter with the capacitor. The motor-driven compressor further includes an inverter accommodation chamber that accommodates the inverter circuit, the capacitor, and the coil.

Japanese Laid-Open Patent Publication No. 2015-48800 discloses an example of a motor-driven compressor including a plastic holder that holds a capacitor and a coil. The holder is arranged in the inverter accommodation chamber and attached to a housing by screw members. Thus, the capacitor and the coil are accommodated in the inverter accommodation chamber.

Some motor-driven compressors are provided with a resistor that is electrically connected to a capacitor. The size of the resistor is proportional to a resistance value. That is, the higher the resistance value, the larger the size of the resistor. A large resistor cannot be easily attached to the circuit board of an inverter circuit. Thus, a large resistor is accommodated in the inverter accommodation chamber together with the inverter circuit, the capacitor, and the coil by attaching the large resistor to a housing by screw members. In this case, space needs to be provided in the inverter accommodation to arrange the screw members that attach the resistor to the housing. Further, space is also needed to fasten the screw members. This will result in an increase in the size of the motor-driven compressor.

SUMMARY

It is an objective of the present disclosure to provide a motor-driven compressor capable of being reduced in size even when a large resistor is provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above-described problem, a motor-driven compressor according to a first aspect of the present disclosure includes a rotary shaft, a compression portion that compresses fluid by rotation of the rotary shaft, an electric motor that rotates the rotary shaft, an inverter circuit that drives the electric motor, a capacitor arranged on an input side of the inverter circuit and connected in parallel to a direct-current power supply, a coil configuring a LC filter with the capacitor, a holder that holds the capacitor and the coil, a resistor electrically connected to the capacitor, and a housing including an inverter accommodation chamber that accommodates the inverter circuit, the holder, and the resistor. The housing includes an internal threaded hole into which a screw member is screwed. The resistor includes a resistor insertion hole through which the screw member is inserted. The holder includes a holder insertion hole through which the screw member is inserted. The screw member that has passed through the holder insertion hole and the resistor insertion hole being screwed into the internal threaded hole fixes the holder and the resistor to the housing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor 10 according to an embodiment will now be described with reference to FIGS. 1 to 8. The motor-driven compressor 10 of the present embodiment is employed in, for example, a vehicle air conditioner.

Figure 1:
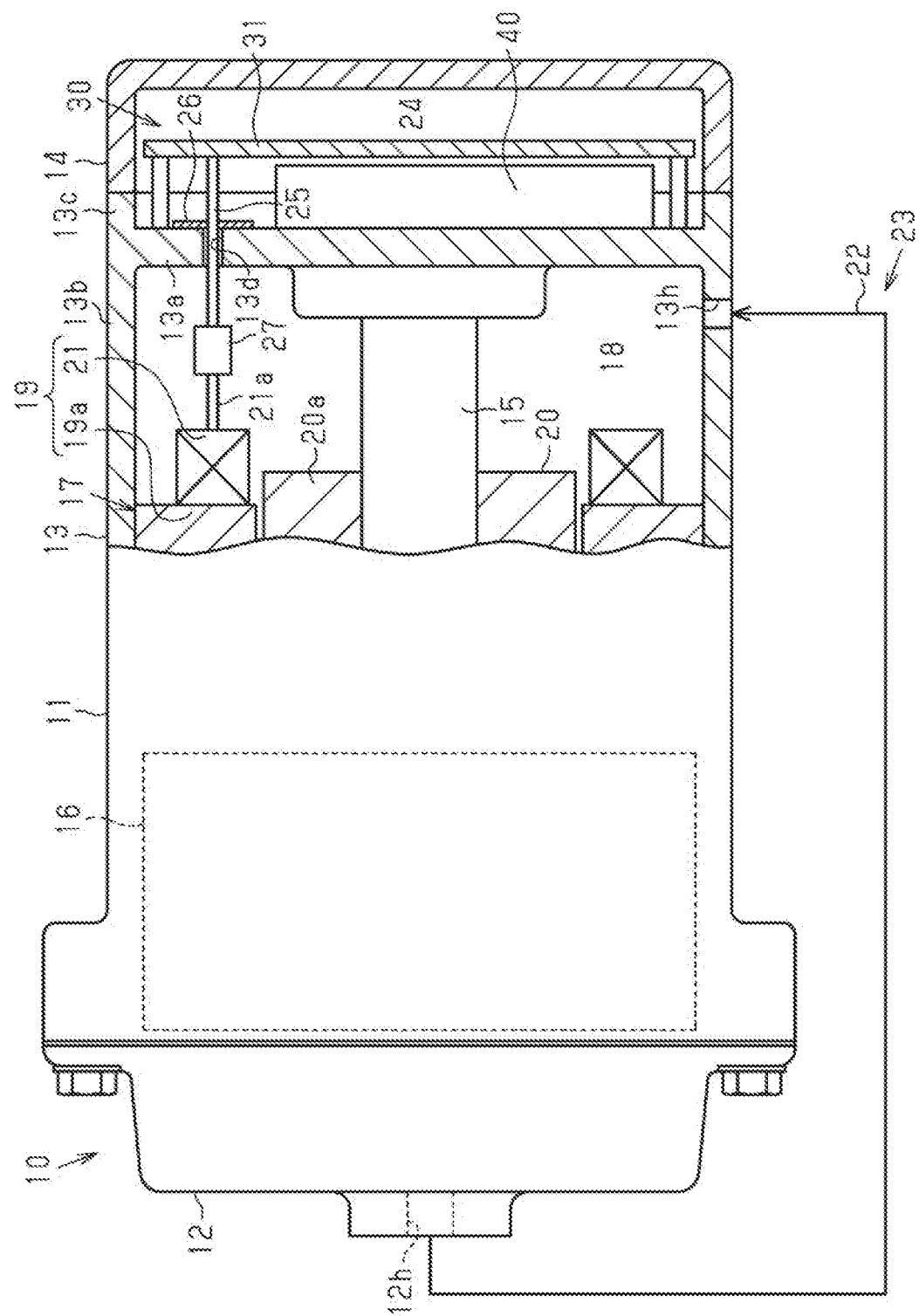
FIG. 1 is a partially cutaway side cross-sectional view showing a motor-driven compressor according to an embodiment of the present disclosure.

As shown in FIG. 1, the motor-driven compressor 10 includes a housing 11. The housing 11 includes a discharge housing member 12, a motor housing member 13, and a cover 14. The discharge housing member 12, the motor housing member 13, and the cover 14 have a closed end and are tubular. The motor housing member 13 is coupled to the discharge housing member 12, and the cover 14 is coupled to the motor housing member 13. The discharge housing member 12, the motor housing member 13, and the cover 14 are made of a metal material such as aluminum. The motor housing member 13 includes a bottom wall 13a and a circumferential wall 13b. The circumferential wall 13b is a tubular body extending from an outer circumferential edge of the bottom wall 13a.

The motor housing member 13 internally accommodates a rotary shaft 15. Further, the motor housing member 13 internally accommodates a compression portion 16 and an electric motor 17 that rotates the rotary shaft 15. The compression portion 16 is driven by rotation of the rotary shaft 15 to compress refrigerant serving as fluid. The compression portion 16 and the electric motor 17 are laid out in the axial direction of the rotary shaft 15. The electric motor 17 is arranged between the compression portion 16 and the bottom wall 13a of the motor housing member 13. A motor chamber 18 that accommodates the electric motor 17 is defined between the compression portion 16 and the bottom wall 13a in the motor housing member 13. Accordingly, the motor housing member 13 includes the motor chamber 18 that accommodates the electric motor 17.

The compression portion 16 is, for example, a scroll-type compressor including a fixed scroll (not shown) fixed in the motor housing member 13 and a movable scroll (not shown) opposed to the fixed scroll.

The electric motor 17 includes a tubular stator 19 and a rotor 20 arranged inside the stator 19. The rotor 20 rotates integrally with the rotary shaft 15. The stator 19 surrounds the rotor 20. The rotor 20 includes a rotor core 20a secured to the rotary shaft 15 and permanent magnets (not shown) arranged on the rotor core 20a. The stator 19 includes a tubular stator core 19a and a motor coil 21 wound around the stator core 19a.

The circumferential wall 13b includes a suction port 13h. A first end of an external refrigerant circuit 22 is connected to the suction port 13h. The discharge housing member 12 includes a discharge port 12h. A second end of the external refrigerant circuit 22 is connected to the discharge port 12h. The suction port 13h is located in the proximity of the bottom wall 13a in the circumferential wall 13b. The suction port 13h connects to the motor chamber 18.

Refrigerant is drawn from the external refrigerant circuit 22 through the suction port 13h into the motor chamber 18. As a result, the refrigerant is compressed at the compression portion 16 and then flows through the discharge port 12h to a refrigerant circuit 22. The refrigerant that has flowed to the external refrigerant circuit 22 flows through a heat exchanger or an expansion valve of the external refrigerant circuit 22. Then, the refrigerant flows through the suction port 13h and returns to the motor chamber 18. That is, the motor housing member 13 includes the suction port 13h through which refrigerant is drawn into the motor chamber 18 from the outside. The motor-driven compressor 10 and the external refrigerant circuit 22 configure a vehicle air conditioner 23.

The motor housing member 13 includes a tubular extension wall 13c. The extension wall 13c extends in the axial direction of the rotary shaft 15 from the bottom wall 13a toward the side opposite to the discharge housing member 12. The cover 14 is attached to an open end of the extension wall 13c so as to close the opening of the extension wall 13c. The outer surface of the bottom wall 13a of the motor housing member 13, the inner circumferential surface of the extension wall 13c, and the cover 14 define an inverter accommodation chamber 24 that accommodates an inverter circuit 30. That is, the housing 11 includes the inverter accommodation chamber 24. The compression portion 16, the electric motor 17, and the inverter circuit 30 are laid out in this order in the axial direction of the rotary shaft 15. Thus, the motor chamber 18 is adjacent to the inverter accommodation chamber 24 with the bottom wall 13a located in between in the axial direction of the rotary shaft 15. The inverter circuit 30 drives the electric motor 17.

The inverter circuit 30 includes a circuit board 31. Three conductive members 25 are electrically connected to the circuit board 31. Each conductive member 25 is columnar. The bottom wall 13a includes a through hole 13d. Each conductive member 25 projects from the inverter accommodation chamber 24 through the through hole 13d into the motor chamber 18. The three conductive members 25 are supported on the outer surface of the bottom wall 13a together with a support plate 26. Three motor wires 21a are pulled out of the motor coil 21. The three conductive members 25 are electrically connected to the three motor wires 21a respectively by a cluster block 27 arranged in the motor chamber 18. The motor coil 21 is supplied with power from the circuit board 31 through the conductive members 25, the cluster block 27, and the motor wires 21a. This rotates the rotor 20 and causes the rotary shaft 15 to rotate integrally with the rotor 20.

Figure 2:
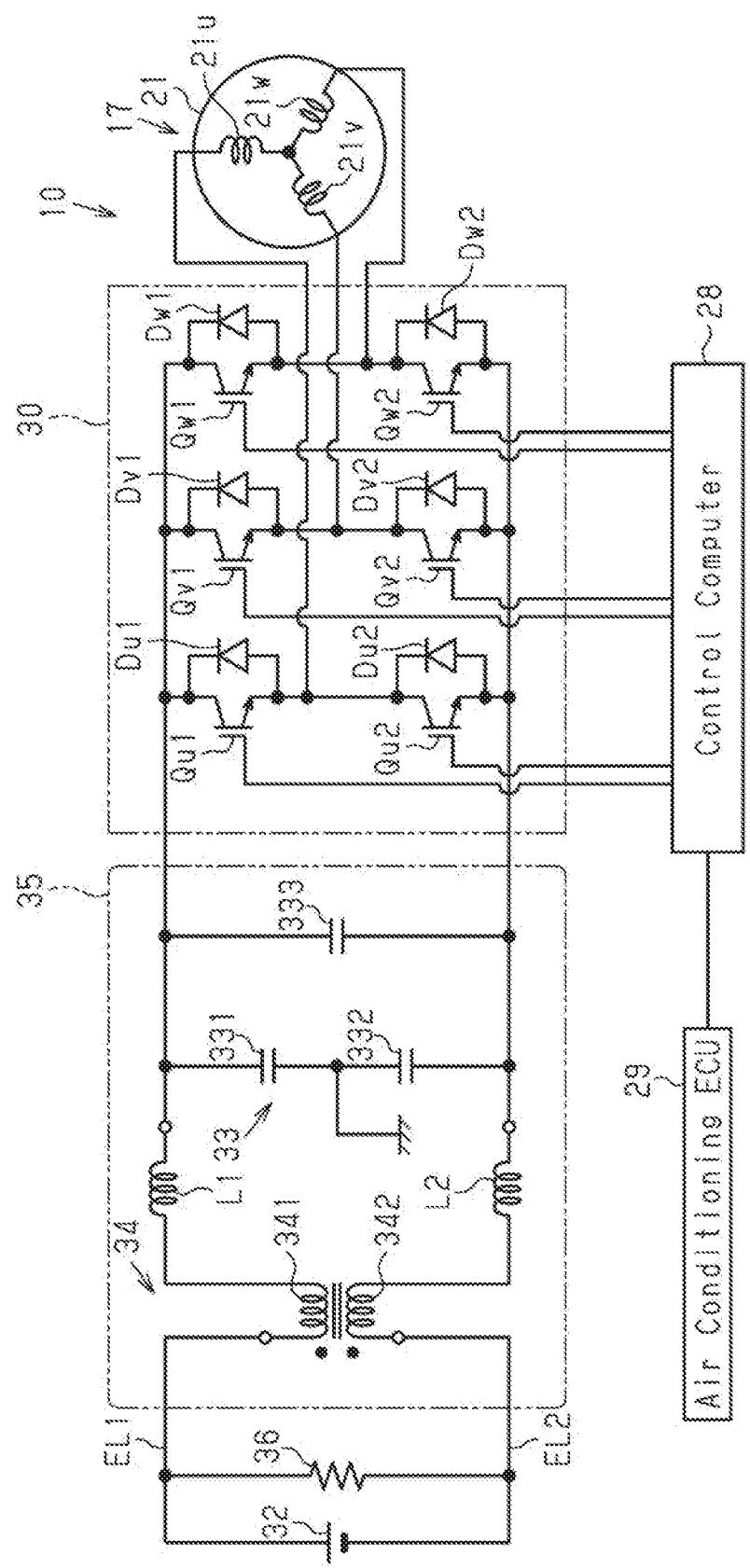
FIG. 2 is a circuit diagram showing the electrical configuration of the motor-driven compressor.

As shown in FIG. 2, the motor coil 21 is of a three-phase structure with a u-phase coil 21u, a v-phase coil 21v, and a w-phase coil 21w. In the present embodiment, the u-phase coil 21u, the v-phase coil 21v, and the w-phase coil 21w form a Y-connection.

The inverter circuit 30 includes switching elements Qu1, Qu2, Qv1, Qv2, Qw1, and Qw2. The switching elements Qu1, Qu2, Qv1, Qv2, Qw1, and Qw2 perform switching operation to drive the electric motor 17. The switching elements Qu1, Qu2, Qv1, Qv2, Qw1, and Qw2 are insulated-gate bipolar transistors (IGBTs), or power switching elements. Diodes Du1, Du2, Dv1, Dv2, Dw1, and Dw2 are respectively connected to the switching elements Qu1, Qu2, Qv1, Qv2, Qw1, and Qw2. The diodes Du1, Du2, Dv1, Dv2, Dw1, and Dw2 are respectively connected in parallel to the switching elements Qu1, Qu2, Qv1, Qv2, Qw1, and Qw2.

Each of the switching elements Qu1, Qv1, and Qw1 configures an upper arm of the corresponding phase. Each of the switching elements Qu2, Qv2, and Qw2 configures a lower arm of the corresponding phase. The switching element Qu1 is connected in series to the switching element Qu2. The switching element Qv1 is connected in series to the switching element Qv2. The switching element Qw1 is connected in series to the switching element Qw2. Each of the switching elements Qu1, Qu2, Qv1, Qv2, Qw1, and Qw2 includes a gate that is electrically connected to a control computer 28.

Each of the switching elements Qu1, Qv1, and Qw1 includes a collector that is electrically connected to the positive electrode of a direct-current power supply 32 via a first connection line EL1. Each of the switching element Qu2, Qv2, and Qw2 includes an emitter that is electrically connected to the negative electrode of the direct-current power supply 32 via a second connection line EL2. The emitter of the switching element Qu1 and the collector of the switching element Qu2 are electrically connected to the u-phase coil 21u from the midpoint of the wire that connects the emitter and the collector in series. The emitter of the switching element Qv1 and the collector of the switching element Qv2 are electrically connected to the v-phase coil 21v from the midpoint of the wire that connects the emitter and the collector in series. The emitter of the switching element Qw1 and the collector of the switching element Qw2 are electrically connected to the w-phase coil 21w from the midpoint of the wire that connects the emitter and the collector in series.

The control computer 28 controls the drive voltage of the electric motor 17 through pulse width modulation. More specifically, the control computer 28 generates a PWM signal with a high-frequency triangular wave signal, which is referred to as a carrier wave, and a voltage command signal for commanding voltage. Further, the control computer 28 performs control (on-off control) of the switching operation of each of the switching elements Qu1, Qu2, Qv1, Qv2, Qw1, and Qw2 using the generated PWM signal. This converts the direct-current voltage from the direct-current power supply 32 into alternating-current voltage. The converted alternating-current voltage is applied as the drive voltage to the electric motor 17 to control the driving of the electric motor 17.

Further, the control computer 28 controls the PWM signal to variably control the duty ratio of the switching operation of each of the switching elements Qu1, Qu2, Qv1, Qv2, Qw1, and Qw2. This controls the rotation speed of the electric motor 17. The control computer 28 is electrically connected to an air-conditioning ECU 29. When receiving the information related to a target rotation speed of the electric motor 17 from the air-conditioning ECU 29, the control computer 28 rotates the electric motor 17 with the target rotation speed.

The motor-driven compressor 10 includes a capacitor 33 and a coil 34. The capacitor 33 is arranged on an input side of the inverter circuit 30 and connected in parallel to the direct-current power supply 32. The capacitor 33 includes a first bypass capacitor 331, a second bypass capacitor 332, and a smoothing capacitor 333. The first bypass capacitor 331 has a first end that is electrically connected to the first connection line EL1. The first bypass capacitor 331 has a second end that is electrically connected to the first end of the second bypass capacitor 332. Thus, the first bypass capacitor 331 is connected in series to the second bypass capacitor 332. The second bypass capacitor 332 has a second end that is electrically connected to the second connection line EL2. The midpoint of the wire that connects the second end of the first bypass capacitor 331 to the first end of the second bypass capacitor 332 is grounded to, for example, the body of the vehicle.

The smoothing capacitor 333 has a first end that is electrically connected to the first connection line EL1. The smoothing capacitor 333 has a second end that is electrically connected to the second connection line EL2. The first bypass capacitor 331 and the second bypass capacitor 332 are connected in parallel to the smoothing capacitor 333. The smoothing capacitor 333 is arranged between the first bypass capacitor 331 and the second bypass capacitor 332 and the switching elements Qu1, Qu2, Qv1, Qv2, Qw1, and Qw2.

The coil 34 is a common mode choke coil. The coil 34 includes a first winding 341 arranged on the first connection line EL1 and a second winding 342 arranged on the second connection line EL2. In addition to the first winding 341 and the second winding 342, the coil 34 includes hypothetical normal mode coils L1 and L2. The hypothetical normal mode coils L1 and L2 have a normal mode inductance component generated by the leakage flux from the coil 34. That is, the coil 34 of the present embodiment includes the first winding 341, the second winding 342, and the hypothetical normal mode coils L1 and L2 in terms of equivalent circuit. The first winding 341 is connected in series to the hypothetical normal mode coil L1, and the second winding 342 is connected in series to the hypothetical normal mode coil L2.

The coil 34, the first bypass capacitor 331, the second bypass capacitor 332, and the smoothing capacitor 333 reduce common mode noise. Common mode noise is noise in which current in the same direction flows through the first connection line EL1 and the second connection line EL2. Common mode noise can be generated when the motor-driven compressor 10 and the direct-current power supply 32 are electrically connected via a path other than the first connection line EL1 and the second connection line EL2, such as the body of the vehicle. Thus, the coil 34, the first bypass capacitor 331, the second bypass capacitor 332, and the smoothing capacitor 333 configure a LC filter 35. Thus, the coil 34 configures the LC filter 35 with the capacitor 33.

The motor-driven compressor 10 includes a resistor 36 that is electrically connected to the capacitor 33. The resistor 36 is connected in parallel to the capacitor 33. The resistor 36 is a discharge resistor that discharges electric charge stored in the capacitor 33 when, for example, a power line such as the first connection line EL1 or the second connection line EL2 are broken. The resistor 36 has a first end that is electrically connected to a portion of the first connection line EL1 between the positive electrode of the direct-current power supply 32 and the coil 34. The resistor 36 has a second end that is electrically connected to a portion of the second connection line EL2 between the negative electrode of the direct-current power supply 32 and the second end of the capacitor 33.

Figure 3:
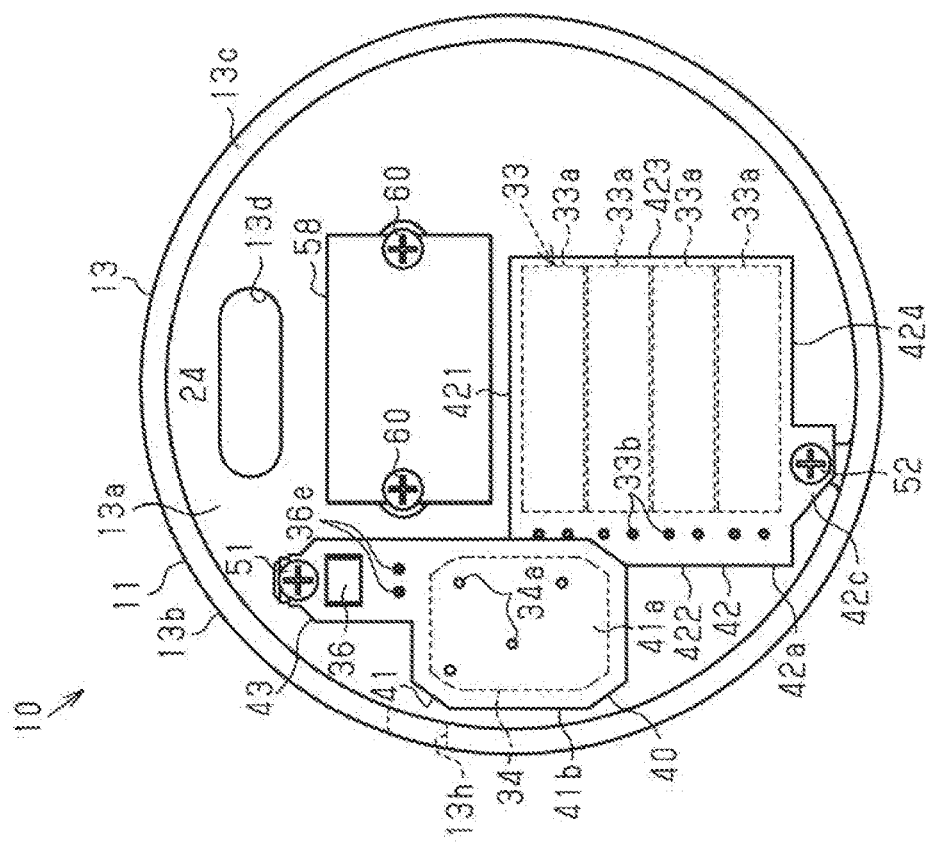
FIG. 3 is a plan view showing the inside of the inverter accommodation chamber.

As shown in FIG. 3, the motor-driven compressor 10 includes a holder 40 that holds the capacitor 33 and the coil 34. The holder 40 is accommodated in the inverter accommodation chamber 24. Further, the resistor 36 and the holder 40 are fixed to the outer surface of the bottom wall 13a of the motor housing member 13 by a screw member 51. Thus, the resistor 36 is accommodated in the inverter accommodation chamber 24. Accordingly, the inverter accommodation chamber 24 accommodates the inverter circuit 30, the holder 40, and the resistor 36. The holder 40 is fixed to the outer surface of the bottom wall 13a of the motor housing member 13 by the screw member 51 and an additional screw member 52, which differs from the screw member 51.

Figure 4:
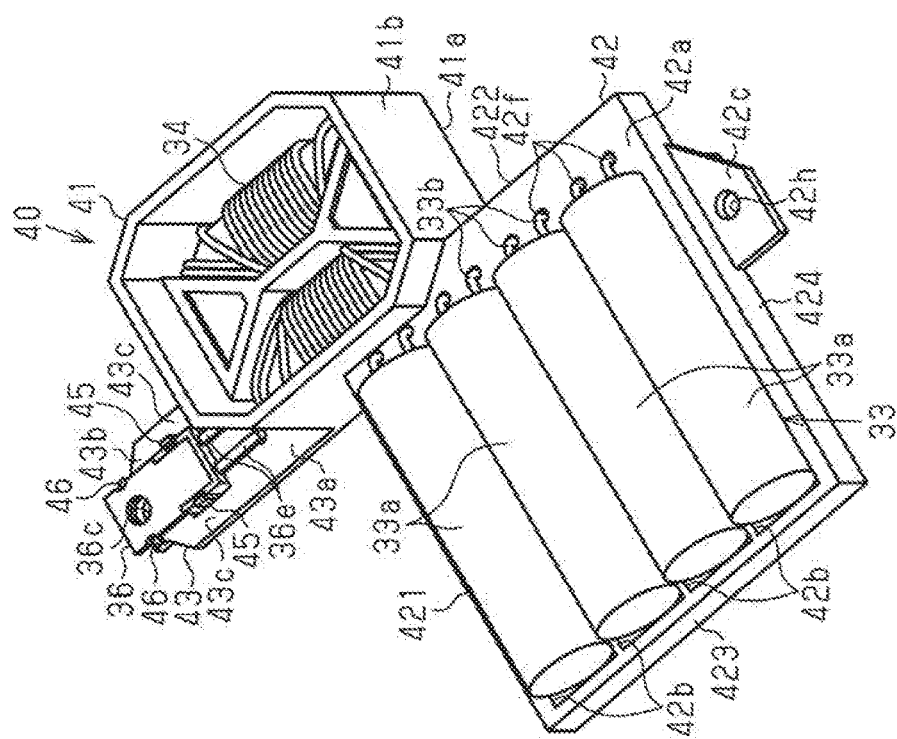
FIG. 4 is a perspective view showing the holder, the coil, the capacitor, and the resistor.
Figure 5:
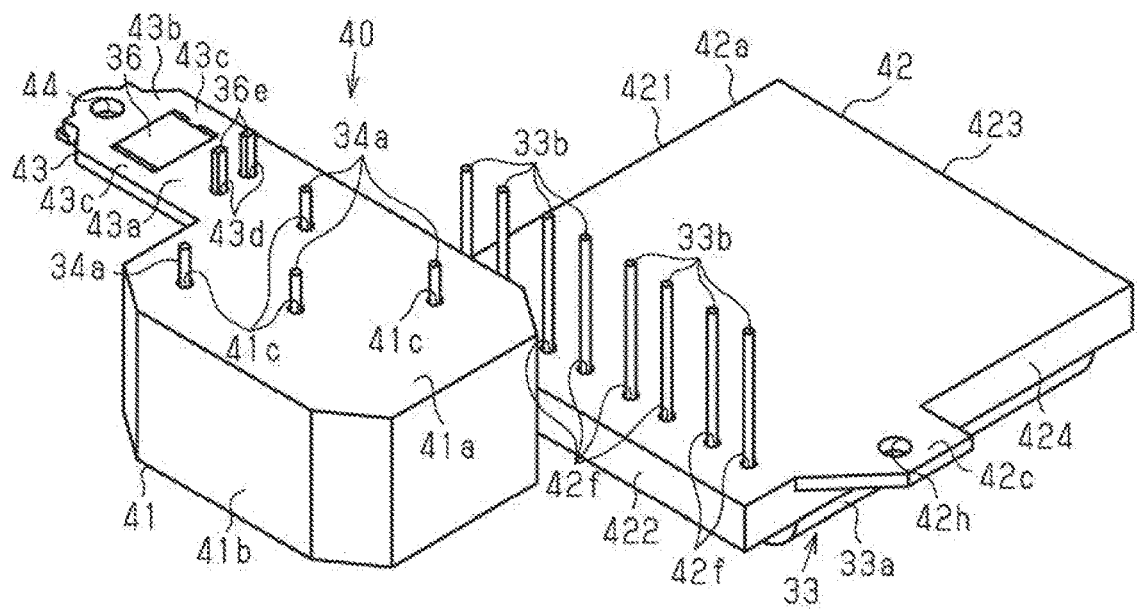
FIG. 5 is a perspective view showing the holder.

As shown in FIGS. 4 and 5, the holder 40 includes a coil holding portion 41 that holds the coil 34, a capacitor holding portion 42 that holds the capacitor 33, and a resistor holding portion 43 that holds the resistor 36. The holder 40 is made of plastic.

The coil holding portion 41 has a closed end and is tubular. The coil holding portion 41 includes a flat coil holding portion bottom wall 41a and a tubular coil holding portion peripheral wall 41b. The coil holding portion peripheral wall 41b is formed into a tubular shape surrounding the coil 34. The coil holding portion peripheral wall 41b extends upright from an outer peripheral part of the coil holding portion bottom wall 41a. The coil 34 is accommodated in the coil holding portion 41 and held by the coil holding portion 41. The coil holding portion bottom wall 41a includes coil lead insertion holes 41c. A coil lead 34a pulled out of the coil 34 is inserted through each coil lead insertion hole 41c. Each of the coil leads 34a pulled out of the coil 34 passes through the corresponding coil lead insertion hole 41c from the inside of the coil holding portion 41 and projects from the outer surface of the coil holding portion bottom wall 41a toward the outside of the coil holding portion 41. The portions of the coil leads 34a projecting toward the outside of the coil holding portion 41 are electrically connected to the circuit board 31 by, for example, soldering. Thus, the coil 34 is mounted on the circuit board 31 by the coil leads 34a.

The capacitor holding portion 42 includes a quadrilateral plate-shaped capacitor supporting wall 42a extending from a part of the outer peripheral surface of the coil holding portion peripheral wall 41b. The thickness direction of the capacitor supporting wall 42a coincides with the thickness direction of the coil holding portion bottom wall 41a.

The capacitor supporting wall 42a includes four side surfaces, namely, a first side surface 421, a second side surface 422, a third side surface 423, and a fourth side surface 424. The first side surface 421 is continuous with the outer peripheral surface of the coil holding portion peripheral wall 41b and extends straight. The second side surface 422 is continuous with the outer peripheral surface of the coil holding portion peripheral wall 41b and extends in a direction that is orthogonal to the first side surface 421. The third side surface 423 is continuous with the edge of the first side surface 421 on the side opposite to the outer peripheral surface of the coil holding portion peripheral wall 41b and extends in parallel to the second side surface 422. The fourth side surface 424 connects the edge of the third side surface 423 on the side opposite to the first side surface 421 and the edge of the second side surface 422 on the side opposite to the outer peripheral surface of the coil holding portion peripheral wall 41b to each other and extends in parallel to the first side surface 421.

The capacitor supporting wall 42a includes four capacitor accommodation recesses 42b. Each capacitor accommodation recess 42b accommodates one of four electrolytic capacitors 33a that configure the capacitor 33. The four electrolytic capacitors 33a configure the first bypass capacitor 331, the second bypass capacitor 332, and the smoothing capacitor 333. The four capacitor accommodation recesses 42b are laid out in the extension direction of the second side surface 422 and the third side surface 423 and arranged between the first side surface 421 and the fourth side surface 424. Each electrolytic capacitor 33a is accommodated in the corresponding capacitor accommodation recess 42b and held by the capacitor holding portion 42.

The capacitor supporting wall 42a includes capacitor lead insertion holes 42f. Capacitor leads 33b projecting from the electrolytic capacitors 33a are inserted through the capacitor lead insertion holes 42f. The capacitor leads 33b projecting from the electrolytic capacitors 33a pass through the capacitor lead insertion holes 42f and project from the surfaces of the capacitor holding portions 42 on the side opposite to the capacitor accommodation recesses 42b. The portions of the capacitor leads 33b projecting from the surface of the capacitor holding portion 42 are electrically connected to the circuit board 31 by, for example, soldering. Thus, the electrolytic capacitors 33a are mounted on the circuit board 31 by the capacitor leads 33b.

The capacitor holding portion 42 includes a flat projecting wall 42c. The projecting wall 42c projects from the fourth side surface 424 toward the side opposite to the first side surface 421. The thickness direction of the projecting wall 42c coincides with the thickness direction of the coil holding portion bottom wall 41a. The projecting wall 42c includes a circular additional screw member insertion hole 42h through which the additional screw member 52 is inserted. The additional screw member insertion hole 42h extends through the projecting wall 42c in its thickness direction. Thus, the additional screw member insertion hole 42h is located on the portion of the capacitor holding portion 42 on the side opposite to the coil holding portion peripheral wall 41b.

Figure 6:
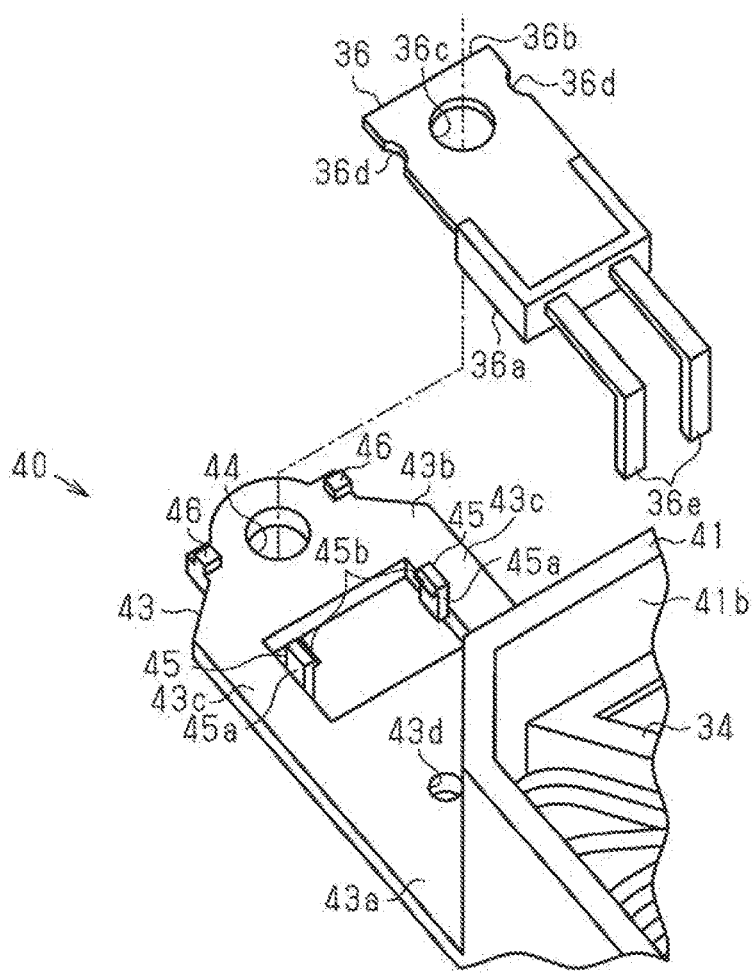
FIG. 6 is an exploded perspective view showing a part of the resistor and the holder.

As shown in FIGS. 5 and 6, the resistor holding portion 43 includes a flat resistor holding portion extending wall 43a. The resistor holding portion extending wall 43a extends from a part of the outer peripheral surface of the coil holding portion peripheral wall 41b. Thus, the capacitor holding portion 42 and the resistor holding portion 43 extend from a part of the outer peripheral surface of the coil holding portion peripheral wall 41b. The capacitor holding portion 42 and the resistor holding portion 43 extend from the coil holding portion peripheral wall 41b in directions that are orthogonal to each other.

The thickness direction of the resistor holding portion extending wall 43a coincides with the thickness direction of the coil holding portion bottom wall 41a. The extension direction of the resistor holding portion extending wall 43a coincides with the thickness direction of the second side surface 422 of the capacitor holding portion 42. The extension direction of the resistor holding portion extending wall 43a from the outer peripheral surface of the coil holding portion peripheral wall 41b is opposite to the extension direction of the second side surface 422 from the outer peripheral surface of the coil holding portion peripheral wall 41b.

The resistor holding portion 43 includes an insertion hole forming wall 43b including a circular holder insertion hole 44 through which the screw member 51 is inserted. Thus, the resistor holding portion 43 includes the holder insertion hole 44. Accordingly, the holder 40 includes the holder insertion hole 44. The insertion hole forming wall 43b is located farther from the coil holding portion peripheral wall 41b than the resistor holding portion extending wall 43a. The thickness direction of the insertion hole forming wall 43b coincides with the thickness direction of the coil holding portion bottom wall 41a. The holder insertion hole 44 extends through the insertion hole forming wall 43b in its thickness direction.

Further, the resistor holding portion 43 includes two coupling portions 43c that couple the resistor holding portion extending wall 43a to the insertion hole forming wall 43b. The two coupling portions 43c extend in parallel to each other. The two coupling portions 43c are quadrilateral and columnar. The two coupling portions 43c are separated from each other in the extension direction of the first side surface 421 of the capacitor holding portion 42.

As shown in FIG. 6, the holder 40 includes two holding tabs 45 that hold the resistor 36. Each holding tab 45 includes an elongated thin plate-shaped upright portion 45a and a tab portion 45b. Each holding tab 45 is hook-shaped. The upright portions 45a extend upright from opposing parts of the coupling portions 43c. One of the tab portions 45b projects toward the other one of the tab portions 45b from the distal end of each upright portion 45a. The upright direction of the upright portion 45a from each coupling portion 43c coincides with the upright direction of the coil holding portion peripheral wall 41b from the coil holding portion bottom wall 41a. The two holding tabs 45 can be flexed from the basal ends of the upright portions 45a in a direction in which the holding tabs 45 move toward and away from each other.

The holder 40 includes two contact portions 46. The two contact portions 46 are projections that respectively project from opposite sides of the insertion hole forming wall 43b (i.e., portions corresponding to opposite sides of the holder insertion hole 44) when the insertion hole forming wall 43b is viewed in the axial direction of the holder insertion hole 44. The two contact portions 46 are separated from each other in the extension direction of the first side surface 421 of the capacitor holding portion 42.

The projection direction of the two contact portions 46 from the insertion hole forming wall 43b coincides with the upright direction of the coil holding portion peripheral wall 41b from the coil holding portion bottom wall 41a. Thus, the projection direction of the contact portions 46 from the insertion hole forming wall 43b coincides with the upright direction of the two holding tabs 45 from the coupling portions 43c. The distance between the two contact portions 46 is shorter than the distance between the upright portions 45a of the two holding tabs 45.

The resistor 36 includes a quadrilateral block-shaped mold portion 36a and a quadrilateral flat flange 36b projecting from the mold portion 36a. The mold portion 36a incorporates a resistor (not shown). The entire shape of the resistor 36 is elongated and quadrilateral in a plan view. The flange 36b includes a circular resistor insertion hole 36c through which the screw member 51 is inserted. The resistor insertion hole 36c is located at the first end of the resistor 36 and extended through the flange 36b in its thickness direction. The resistor 36 is arranged on the resistor holding portion 43 such that the first end of the resistor 36 overlaps the insertion hole forming wall 43b of the resistor holding portion 43 and the second end of the resistor 36 overlaps the resistor holding portion extending wall 43a of the resistor holding portion 43.

The opposite sides of the flange 36b located in the lateral direction of the resistor 36 respectively include recesses 36d. The two recesses 36d are located on the opposite sides of the flange 36b (i.e., portions corresponding to the opposite sides of the resistor insertion hole 36c) when the resistor 36 is viewed in the axial direction of the resistor insertion hole 36c. The two recesses 36d have a recessed surface that is curved in an arcuate manner. The distance between the two recesses 36d is shorter than the distance between the two contact portions 46. Further, the length of the mold portion 36a in the lateral direction of the resistor 36 is longer than the distance between the two tab portions 45b and shorter than the distance between the two upright portions 45a.

When the resistor 36 is forcibly pushed toward the resistor holding portion extending wall 43a and the insertion hole forming wall 43b with the mold portion 36a in abutment with the tab portions 45b of the two holding tabs 45, the two holding tabs 45 flex from the basal ends of the upright portions 45a in the direction in which the holding tabs 45 separate from each other. When the resistor 36 is further pushed to move the mold portion 36a over the tab portions 45b, the two holding tabs 45 return to the original shape prior to flexing. This causes the resistor 36 to be held by the resistor holding portion 43 with the mold portion 36a engaged with the tab portions 45b of the two holding tabs 45.

Figure 7:
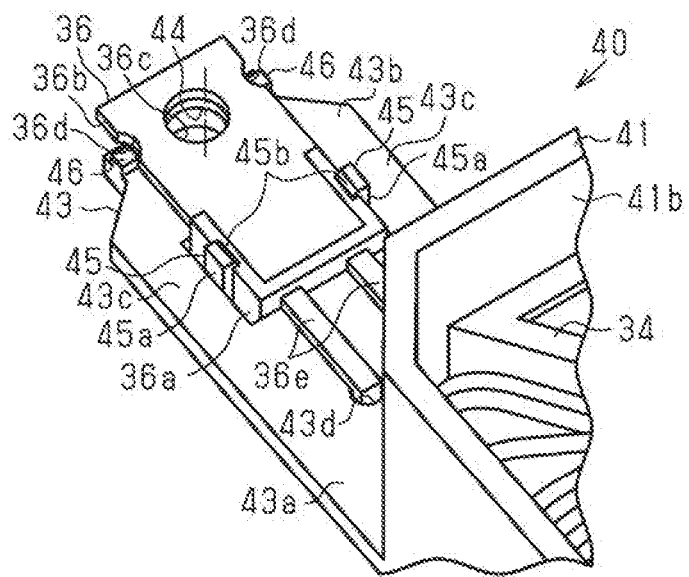
FIG. 7 is a perspective view showing a part of the resistor and the holder.

As shown in FIG. 7, the resistor insertion hole 36c overlaps the holder insertion hole 44 with the resistor 36 held by the resistor holding portion 43. In this state, for example, the resistor 36 may move relative to the resistor holding portion 43 in the extension direction of the first side surface 421 of the capacitor holding portion 42 or in the extension direction of the second side surface 422 of the capacitor holding portion 42. In this case, each contact portion 46 is in contact with the recessed surface of the corresponding recess 36d. Thus, the two contact portions 46 can respectively contact opposite sides of the resistor 36 as viewed in the axial direction of the resistor insertion hole 36c. The contact of each of the two contact portions 46 on the recessed surface of the corresponding recess 36d restricts the resistor 36 from moving in the extension direction of the first side surface 421 of the capacitor holding portion 42 and restricts the resistor 36 from moving in the extension direction of the second side surface 422 of the capacitor holding portion 42. This limits displacement of the resistor 36 from the holder 40 and thus limits displacement of the holder insertion hole 44 and the resistor insertion hole 36c.

The resistor holding portion extending wall 43a includes resistor lead insertion holes 43d. A resistor lead 36e projecting through the end of the mold portion 36a on the side opposite to the flange 36b is inserted through each resistor lead insertion hole 43d. Each resistor lead 36e passes through the corresponding resistor lead insertion hole 43d and projects from the surface of the resistor holding portion extending wall 43a on the side opposite to the resistor 36. The portions of the resistor leads 36e projecting from the surface of the resistor holding portion extending wall 43a are electrically connected to the circuit board 31 by, for example, soldering. Thus, the resistor 36 is mounted on the circuit board 31 by the resistor lead 36e.

Figure 8:
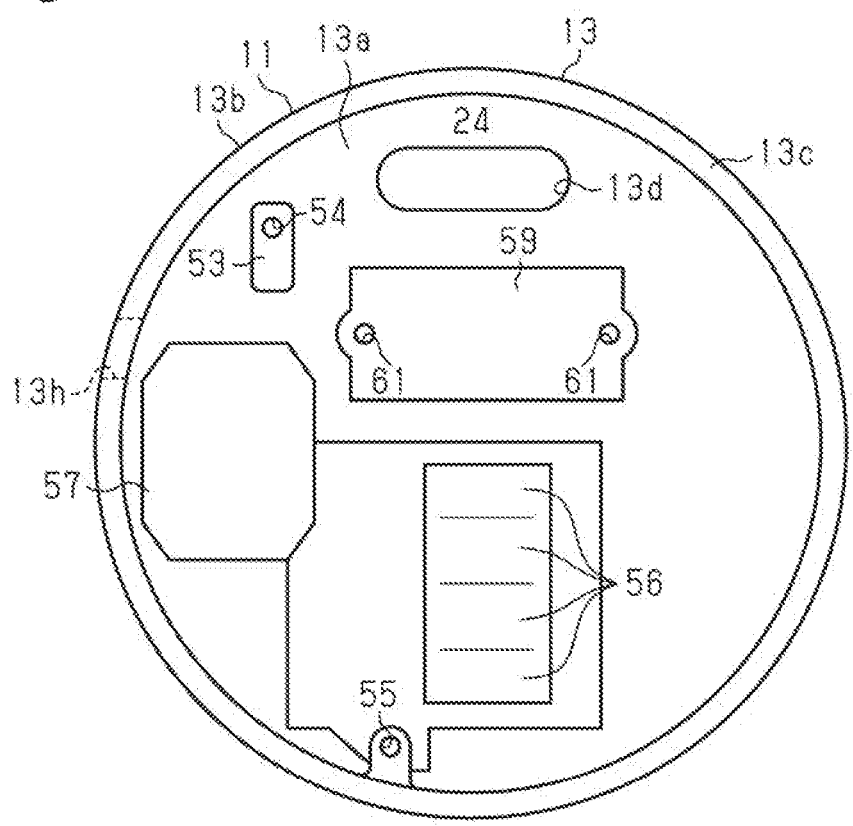
FIG. 8 is a plan view of the motor housing member.

As shown in FIG. 8, the outer surface of the bottom wall 13a of the motor housing member 13 includes a resistor mount surface 53 on which the resistor 36 is mounted. The resistor mount surface 53 includes an internal threaded hole 54 into which the screw member 51 is screwed. Further, the outer surface of the bottom wall 13a of the motor housing member 13 includes an additional screw member internal threaded hole 55 into which the additional screw member 52 that has passed through the additional screw member insertion hole 42h is screwed.

The outer surface of the bottom wall 13a of the motor housing member 13 includes four capacitor mount surfaces 56 on which the electrolytic capacitors 33a are respectively mounted. Further, the outer surface of the bottom wall 13a of the motor housing member 13 includes a coil mount surface 57 on which the coil 34 is mounted. In addition, the outer surface of the bottom wall 13a of the motor housing member 13 includes an element mount surface 59 on which a power module 58 is mounted. In the power module 58, the switching elements Qu1, Qu2, Qv1, Qv2, Qw1, and Qw2 are modularized. The power module 58 is rectangular in a plan view. The power module 58 converts the direct-current voltage from the direct-current power supply 32 into alternating-current voltage. The element mount surface 59 includes two element internal threaded holes 61 into which element fixing screw members 60 are screwed. The element fixing screw members 60 are used to fix the power module 58.

As shown in FIG. 3, the holder 40 is arranged on the bottom wall 13a of the motor housing member 13 with the upright direction of the coil holding portion peripheral wall 41b from the coil holding portion bottom wall 41a oriented toward the bottom wall 13a of the motor housing member 13. The screw member 51 that has passed through the holder insertion hole 44 and the resistor insertion hole 36c being screwed into the internal threaded hole 54 fixes the holder 40 and the resistor 36 to the bottom wall 13a of the motor housing member 13. The resistor 36 is pressed against the resistor mount surface 53 by an axial force produced by the screw member 51. The additional screw member 52 that has passed through the additional screw member insertion hole 42h being screwed into the internal threaded hole 55 attaches the projecting wall 42c to the bottom wall 13a of the motor housing member 13. Thus, the holder 40 is fixed to the bottom wall 13a of the motor housing member 13 by the screw member 51 and the additional screw member 52.

Each electrolytic capacitor 33a is mounted on the corresponding capacitor mount surface 56 with thermal grease applied between the electrolytic capacitor 33a and the capacitor mount surface 56. This thermally couples each electrolytic capacitor 33a to the corresponding capacitor mount surface 56 by thermal grease. The coil 34 is mounted on the coil mount surface 57 with thermal grease applied between the coil 34 and the coil mount surface 57. This thermally couples the coil 34 to the coil mount surface 57 by thermal grease. The resistor 36 is mounted on the resistor mount surface 53 with thermal grease applied between the resistor 36 and the resistor mount surface 53. This thermally couples the resistor 36 to the resistor mount surface 53 by thermal grease.

Each element fixing screw member 60 being screwed into the corresponding element internal threaded hole 61 fixes the power module 58 to the bottom wall 13*a* of the motor housing member 13. In a plan view of the power module 58 accommodated in the inverter accommodation chamber 24, most part of the power module 58 opposes the first side surface 421 in the extension direction of the second side surface 422 and opposes the coil holding portion peripheral wall 41*b* and the resistor holding portion 43 in the extension direction of the first side surface 421. Thus, the power module 58 includes different sides adjacent to the capacitor holding portion 42 and the resistor holding portion 43 in a plan view.

The power module 58 is mounted on the element mount surface 59 with thermal grease applied between the power module 58 and the element mount surface 59. This thermally couples the power module 58 to the element mount surface 59 by thermal grease. Thus, the electrolytic capacitors 33*a*, the coil 34, the resistor 36, and the power module 58 are thermally coupled to the bottom wall 13*a* of the motor housing member 13 and attached to the bottom wall 13*a* of the motor housing member 13. The coil 34 and the resistor 36 are located closer to the suction port 13*h* than the electrolytic capacitors 33*a* as viewed in the axial direction of the rotary shaft 15.

The operation of the present embodiment will now be described.

The electrolytic capacitors 33*a*, the coil 34, the resistor 36, and the power module 58 are thermally coupled to the bottom wall 13*a* of the motor housing member 13 and attached to the bottom wall 13*a* of the motor housing member 13. Thus, the heat generated from the electrolytic capacitors 33*a*, the coil 34, the resistor 36, and the power module 58 is released by the refrigerant in the motor chamber 18 through the bottom wall 13*a* of the motor housing member 13. As a result, the electrolytic capacitors 33*a*, the coil 34, the resistor 36, and the power module 58 are cooled.

Particularly, the coil 34 and the resistor 36 generate a larger amount of heat than the electrolytic capacitors 33*a*. For this reason, the coil 34 and the resistor 36 are located closer to the suction port 13*h* than the electrolytic capacitors 33*a* as viewed in the axial direction of the rotary shaft 15. Thus, the heat generated from the coil 34 and the resistor 36 is efficiently released through the bottom wall 13*a* of the motor housing member 13 by the refrigerant drawn into the motor chamber 18 from the suction port 13*h*. This efficiently cools the coil 34 and the resistor 36 and thus improves the durability of the coil 34 and the resistor 36.

The above-described embodiment provides the following advantages.

(1) The size of the resistor 36 is proportional to a resistance value. Thus, the higher the resistance value, the larger the size of the resistor 36. In the present embodiment, the screw member 51 that has passed through the holder insertion hole 44 and the resistor insertion hole 36*c* being screwed into the internal threaded hole 54 fixes the holder 40 and the resistor 36 to the bottom wall 13*a* of the motor housing member 13. Thus, the resistor 36 can be attached to the motor housing member 13 using the screw member 51 that attaches the holder 40 to the motor housing member 13. The resistor 36 may be hypothetically attached to the motor housing member 13 using a screw member that differs from the screw member that attaches the holder 40 to the motor housing member 13. Unlike such a case, in the present embodiment, the inverter accommodation chamber 24 does not need to internally have the space for arranging the screw member that attaches the resistor 36 to the motor housing member 13 and the space for fastening the screw member. This reduces the space in the inverter accommodation chamber 24. Thus, even when a large resistor 36 is arranged, the motor-driven compressor 10 can be reduced in size.

(2) The capacitor holding portion 42 and the resistor holding portion 43 extend from a part of the outer peripheral surface of the coil holding portion peripheral wall 41*b*. This allows the coil 34, the capacitor 33, and the resistor 36 to be arranged relative to the holder 40 at positions suitable for the flow of electricity. More specifically, the resistor 36 is located away from the capacitor 33 such that the coil 34 is arranged between the capacitor 33 and the resistor 36 where current frequently flows in and out during operation of the inverter circuit 30. This reduces the loss in the resistor 36. Thus, the coil 34, the capacitor 33, and the resistor 36 can be efficiently arranged in a limited space in the inverter accommodation chamber 24. This further reduces the space in the inverter accommodation chamber 24 and thus further reduces the size of the motor-driven compressor 10.

(3) The part of the capacitor holding portion 42 on the side opposite to the coil holding portion peripheral wall 41*b* includes the additional screw member insertion hole 42*h*. The motor housing member 13 includes the additional screw member internal threaded hole 55. Thus, as compared to when, for example, the additional screw member insertion hole 42*h* is located on the resistor holding portion 43 or on the part of the capacitor holding portion 42 between the capacitor 33 and the coil holding portion peripheral wall 41*b*, the screw member 51 can be located maximally away from the additional screw member 52. This allows the holder 40 to be firmly fixed to the motor housing member 13. Thus, the screw member 51 and the additional screw member 52 that fix the holder 40 to the motor housing member 13 can be efficiently arranged in a limited space in the inverter accommodation chamber 24. This further reduces the space in the inverter accommodation chamber 24 and thus further reduces the size of the motor-driven compressor 10.

(4) The power module 58 has different sides adjacent to the capacitor holding portion 42 and the resistor holding portion 43 in a plan view. This further reduces the space in the inverter accommodation chamber 24 and thus further reduces the size of the motor-driven compressor 10.

(5) The coil 34 and the resistor 36 generate a larger amount of heat than the capacitor 33. For this reason, the coil 34 and the resistor 36 are located closer to the suction port 13*h* than the capacitor 33 as viewed in the axial direction of the rotary shaft 15. Thus, the heat generated from the coil 34 and the resistor 36 is efficiently released through the motor housing member 13 by the refrigerant drawn into the motor chamber 18 from the suction port 13*h*. This efficiently cools the coil 34 and the resistor 36 and thus improves the durability of the coil 34 and the resistor 36. Accordingly, since the heat generated from the coil 34 and the resistor 36 is efficiently released, the coil 34, the capacitor 33, and the resistor 36 can be efficiently arranged in a limited space in the inverter accommodation chamber 24. This further reduces the space in the inverter accommodation chamber 24 and thus further reduces the size of the motor-driven compressor 10.

(6) The holder 40 includes the holding tabs 45 that hold the resistor 36. This allows the screw member 51 to fix the holder 40 and the resistor 36 to the motor housing member 13 with the resistor 36 held by the holding tabs 45. Thus, when the screw member 51 is used to fix the holder 40 and the resistor 36 to the motor housing member 13, the separation of the resistor 36 from the holder 40 is limited. Accordingly, fixing the holder 40 and the resistor 36 to the motor housing member 13 using the screw member 51 is facilitated.

(7) The holder 40 includes the two contact portions 46 that can respectively contact the opposite sides of the resistor 36. Thus, the contact of the two contact portions 46 on the opposite sides of the resistor 36 limits the displacement of the resistor 36 from the holder 40. This also limits the displacement of the holder insertion hole 44 and the resistor insertion hole 36c. Accordingly, fixing the holder 40 and the resistor 36 to the motor housing member 13 using the screw member 51 is facilitated.

(8) The contact of the two contact portions 46 on the opposite sides of the resistor 36 limits the displacement of the resistor 36 from the holder 40. This limits the application of load to the resistor lead 36e inserted through the resistor lead insertion hole 43d. Thus, the resistor leads 36e resist deforming.

(9) The recesses 36d are located on the opposite sides of the resistor 36 (i.e., portions corresponding to opposite sides of the resistor insertion hole 36c) when the resistor 36 is viewed in the axial direction of the resistor insertion hole 36c. With the resistor 36 held by the resistor holding portion 43, for example, the resistor 36 may move relative to the resistor holding portion 43 in the extension direction of the first side surface 421 of the capacitor holding portion 42 and in the extension direction of the second side surface 422 of the capacitor holding portion 42. In this case, the contact of each contact portion 46 on the corresponding recess 36d restricts the resistor 36 from moving in the extension direction of the first side surface 421 of the capacitor holding portion 42 and restricts the resistor 36 from moving in the extension direction of the second side surface 422 of the capacitor holding portion 42.

(10) The resistor 36 is pressed against the resistor mount surface 53 by an axial force produced by the screw member 51. Thus, the heat generated from the resistor 36 is efficiently released by the refrigerant in the motor chamber 18 through the bottom wall 13a of the motor housing member 13. This efficiently cools the resistor 36.

(11) The motor housing member 13 is made of a metal material. The holder 40 is made of plastic. Thus, if the resistor 36 produces heat and expands accordingly, the holder 40 can deform elastically. This makes it possible to suppress an increase of stress acting on the resistor 36.

The above-described embodiment may be modified as follows. The above-described embodiments and the following modifications can be combined as long as the combined modifications remain technically consistent with each other.

In the holder 40, the capacitor holding portion 42 and the resistor holding portion 43 do not have to extend from a part of the outer peripheral surface of the coil holding portion peripheral wall 41b. The shape of the holder 40 is not particularly limited. The positions of the coil 34, the capacitor 33, and the resistor 36 relative to the holder 40 are not particularly limited.

The additional screw member insertion hole 42h may be located on the resistor holding portion 43 or a part of the capacitor holding portion 42 located between the capacitor 33 and the coil holding portion peripheral wall 41b.

The coil 34 and the resistor 36 may be located farther from the suction port 13h than the capacitor 33 as viewed in the axial direction of the rotary shaft 15.

The holder 40 does not have to include the holding tab 45, and the resistor 36 does not have to be held by the holder 40. In short, the resistor 36 simply needs to be fixed to the bottom wall 13a of the motor housing member 13 with the holder 40 by screwing the screw member 51 that has passed through the holder insertion hole 44 and the resistor insertion hole 36c into the internal threaded hole 54.

The holder 40 does not have to include the two contact portions 46.

The recesses 36d do not have to be arranged on the opposite sides of the resistor 36 (i.e., portions corresponding to the opposite sides of the resistor insertion hole 36c). In this case, the two contact portions 46 can contact the opposite sides of the resistor 36 (i.e., portions corresponding to the opposite sides of the resistor insertion hole 36c).

The resistor 36 may be, for example, a damping resistor. In short, as long as the resistor 36 is electrically connected to the capacitor 33, the resistor 36 may be, for example, connected in series to the capacitor 33. Thus, the use of the resistor 36 is not particularly limited.

The number of the electrolytic capacitors 33a configuring the capacitor 33 is not particularly limited. The number of the capacitor accommodation recesses 42b may be changed in correspondence with the number of the electrolytic capacitors 33a.

The capacitor 33 may be, for example, a film capacitor.

The coil 34 may be, for example, a normal mode choke coil.

In a plan view, different sides of the power module 58 do not have to be adjacent to the capacitor holding portion 42 and the resistor holding portion 43. In short, the position of the power module 58 in the inverter accommodation chamber 24 is not particularly limited.

The motor housing member 13 does not have to include the extension wall 13c. For example, the inverter accommodation chamber 24, which accommodates the inverter circuit 30, may be defined by the outer surface of the bottom wall 13a of the motor housing member 13 and the cover 14 by attaching the cover 14 to the bottom wall 13a of the motor housing member 13.

Housing components may be arranged between the bottom wall 13a of the motor housing member 13 and the cover 14 in the housing 11. In this case, the housing components and the cover 14 may define the inverter accommodation chamber 24, and the holder 40 may be attached to the housing components.

In the housing 11, an inverter case that defines the inverter accommodation chamber 24 may be attached to the bottom wall 13a of the motor housing member 13. In this case, the holder 40 is accommodated in the inverter accommodation chamber 24 and attached to the inner surface of the inverter case.

In the motor-driven compressor 10, for example, the inverter circuit 30 may be located on the outer side of the housing 11 in the radial direction of the rotary shaft 15. In short, the compression portion 16, the electric motor 17, and the inverter circuit 30 may be laid out in this order in the axial direction of the rotary shaft 15. Thus, the motor chamber 18 does not have to be adjacent to the inverter accommodation chamber 24 in the axial direction of the rotary shaft 15.

The compression portion 16 does not have to be of a scroll type and may be of, for example, a piston type or a vane type.

The motor-driven compressor 10 configures the vehicle air conditioner 23. Instead, for example, the motor-driven compressor 10 may be a compressor installed in a fuel cell vehicle to compress air supplied to a fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor comprising:
a rotary shaft;
a compression portion that compresses fluid by rotation of the rotary shaft;
an electric motor that rotates the rotary shaft;
an inverter circuit that drives the electric motor;
a capacitor arranged on an input side of the inverter circuit and connected in parallel to a direct-current power supply;
a coil configuring a LC filter with the capacitor;
a holder that holds the capacitor and the coil;
a resistor electrically connected to the capacitor; and
a housing including an inverter accommodation chamber that accommodates the inverter circuit, the holder, and the resistor, wherein
the housing includes an internal threaded hole into which a screw member is screwed,
the resistor includes a resistor insertion hole through which the screw member is inserted,
the holder includes a holder insertion hole through which the screw member is inserted, and
the screw member that has passed through the holder insertion hole and the resistor insertion hole being screwed into the internal threaded hole fixes the holder and the resistor to the housing, wherein
the housing includes a motor housing member including a motor chamber that accommodates the electric motor,
the motor housing member includes a suction port through which refrigerant serving as the fluid is drawn into the motor chamber from outside,
the motor chamber is adjacent to the inverter accommodation chamber in an axial direction of the rotary shaft, and
the coil and the resistor are located closer to the suction port than the capacitor as viewed in the axial direction of the rotary shaft.

2. The motor-driven compressor according to claim 1, wherein
the holder includes:
a coil holding portion that holds the coil,
a capacitor holding portion that holds the capacitor, and
a resistor holding portion that holds the resistor and includes the holder insertion hole,
the coil holding portion includes:
a coil holding portion bottom wall, and
a tubular coil holding portion peripheral wall extending upright from the coil holding portion bottom wall, the coil holding portion peripheral wall being formed into a tubular shape surrounding the coil, and
the capacitor holding portion and the resistor holding portion extend from a part of an outer peripheral surface of the coil holding portion peripheral wall.

3. The motor-driven compressor according to claim 2, wherein
a part of the capacitor holding portion on a side opposite to the coil holding portion peripheral wall includes an additional screw member insertion hole through which an additional screw member is inserted, the additional screw member being different from the screw member, and
the housing includes an additional screw member internal threaded hole through which the additional screw member that has passed through the additional screw member insertion hole is screwed.

4. The motor-driven compressor according to claim 2, wherein
the capacitor holding portion and the resistor holding portion extend from the coil holding portion peripheral wall in directions that are orthogonal to each other,
the inverter circuit includes a rectangular power module that converts direct-current voltage from the direct-current power supply into alternating-current voltage, and
the power module includes different sides adjacent to the capacitor holding portion and the resistor holding portion.

5. The motor-driven compressor according to claim 1, wherein the holder includes a holding tab that holds the resistor.

6. The motor-driven compressor according to claim 1, wherein
the holder includes two contact portions, and
the two contact portions are capable of respectively contacting opposite sides of the resistor as viewed in an axial direction of the resistor insertion hole.

* * * * *